Nov. 29, 1960 — C. W. MUNDAY — 2,962,656
APPARATUS FOR MEASURING MAGNETIC SUSCEPTIBILITY
Filed May 2, 1958
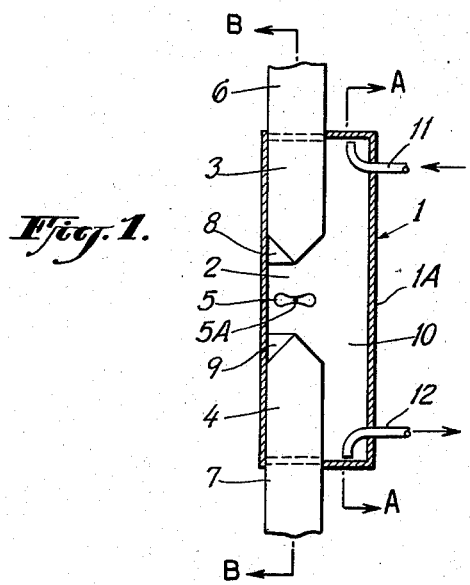
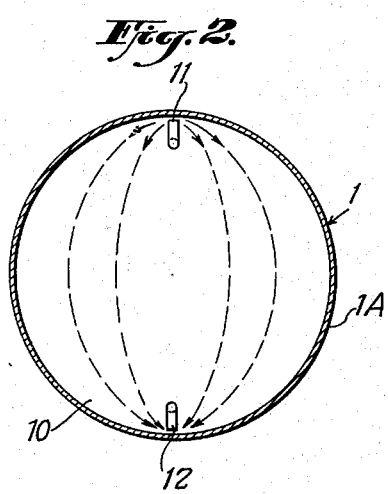
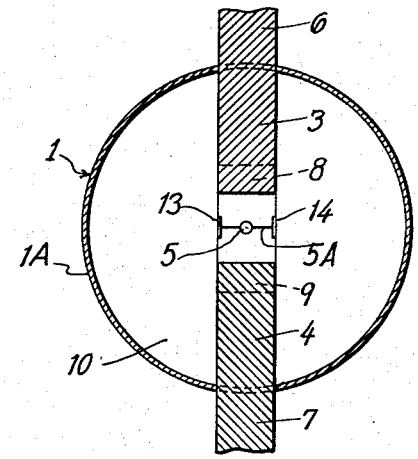
INVENTOR.
CHARLES WALTER MUNDAY
BY
Ward, Neal, Haselton, Orme & McElhannon
ATTORNEYS.

United States Patent Office 2,962,656
Patented Nov. 29, 1960

2,962,656

APPARATUS FOR MEASURING MAGNETIC SUSCEPTIBILITY

Charles Walter Munday, New Eltham, London, England, assignor to The Distillers Company Limited, Edinburgh, Scotland, a British company Filed May 2, 1958, Ser. No. 732,538

Claims priority, application Great Britain May 7, 1957

3 Claims. (Cl. 324—36)

The present invention relates to apparatus for measuring the magnetic susceptibility of a gas so as to enable the composition of the gas to be determined.

Previously known apparatus of this type consists essentially of a test-piece suspended in a non-uniform magnetic field and in a cell containing the gas, together with means for measuring the deflecting force exerted on the test-piece by the gas; variation in the composition of the gas, by creating a corresponding variation in the magnetic susceptibility of the gas, may be arranged to produce a variation in the deflecting force exerted on the test-piece, this variation being arranged in turn to determine changes in the composition of the gas under test.

Such apparatus, examples of which are described and claimed in British Patents Nos. 703,240 and 746,778 comprises a magnet and a cell providing a chamber between the facing poles of the magnet, the cell being made of a substantially non-magnetic material and having a frame and two magnetic pole pieces shaped to produce a non-uniform magnetic field which can fit in the ends of the frame, a test-piece suspended substantially at its centre of gravity on a fibre rigidly supported at both ends within the chamber, means for the passage of gas through the chamber, the chamber being otherwise substantially gas-tight when in position between the poles of the magnet and means for measuring the deflecting force exerted on the test-piece by the gas.

The sensitivity of this type of apparatus depends, among other factors, on the delicacy of the suspension and on the time required, after entry of the gas into the cell, before the gas surrounds the test-piece and fills the cell. When the changes in the composition of a gas stream are to be measured continuously it is desirable to be able to pass the gas stream through the cell at as fast a rate as possible, but the rate of flow of the gas which can be used is limited by the delicacy of the suspension.

It is an object of the present invention to provide apparatus of the type exemplified by those described and claimed in British Patents Nos. 703,240 and 746,778 in which more rapid rates of gas flow can be used without necessitating the use of a more robust test-piece suspension. Using the apparatus of the present invention, the time required for the full deflecting force to be exerted on the test piece after entry of the gas under test may, for example, be reduced to less than four seconds.

Accordingly, the present invention is an apparatus for measuring the magnetic susceptibility of a gas, having a magnet, a cell providing a chamber between the facing poles of the magnet and containing two pole pieces shaped to produce a non-uniform magnetic field within the chamber, a test-piece suspended between the two pole pieces on a fibre, means for passing the gas through the cell and means for measuring the deflecting force exerted on the test-piece by the gas, characterised in that the cell comprises a first zone surrounding the test-piece, a second zone adjacent to the first zone, and means for passing the gas through the second zone, the second zone and the means for passing the gas through it being adapted to promote substantially streamlined flow of the gas in the second zone, wherein the gas circulates in the first zone only by diffusion from the second zone.

The cell is constructed of a substantially non-magnetic material, such as brass, and is assembled for use so that the pole pieces are contained in the first zone of the cell on either side of the suspended test-piece. The cell may either be constructed entirely of the non-magnetic material or, alternatively, the walls of the cell may comprise the pole pieces. Preferably, the cell is adapted so that it can slide between the facing poles of the magnet whereby the first zone can be brought directly into the non-uniform magnetic field between the poles of the magnet. When assembled for use, the cell is arranged to be gas-tight, apart from the means for passing the gas through the second zone.

The magnet used in the apparatus may either be a permanent magnet or an electromagnet; it is preferred, however, to use a permanent magnet.

The first zone of the cell, which surrounds the suspended test-piece and contains the pole-pieces, is conveniently arranged to be sufficiently large in volume on the one hand to accommodate the maximum movement of the test-piece and sufficiently small on the other hand in relation to its area of contact with the second zone so that there is no unnecessary dead-space present in which the gas may be retained after its magnetic susceptibility has been measured. These dead-spaces are preferably filled in with suitably shaped pieces of a non-magnetic material such as brass.

The second zone of the cell is adjacent to the first zone and is preferably not separated from it by any physical barrier, but the two zones may, if desired, be partly separated by a porous or perforated physical barrier through which diffusion can take place; it is preferred to arrange the area of contact between the zones to be as large as possible. This area of contact should be sufficiently large to facilitate diffusion of gas between the two zones without being so large that substantial currents of the gas circulating in the second zone are deflected into the first zone.

The means for passing gas through the second zone for example, may be an inlet tube and an outlet tube which are placed at opposite sides of the second zone. The gas under test is preferably passed through the second zone without causing turbulence in the cell. The preferred stream-lined gas flow may be facilitated if the second zone of the cell is approximately cylindrical in shape and the area of contact with the first zone forms one approximately circular end of the cylinder, by arranging the inlet and outlet tubes to be directed on to opposite interior surfaces of the cell and by reducing to a minimum the number and size of the pillars in the zone necessary to support the construction.

A preferred embodiment of the present invention is illustrated diagrammatically in the accompanying drawings. Figure 1 shows a side view of an embodiment of the invention; Figure 2 shows a cross-section along the line A—A in Figure 1; Figure 3 shows a cross-section along the line B—B in Figure 1.

In the drawings, the cell 1 is constructed of a non-magnetic material and is approximately cylindrical in exterior shape, having an annular wall 1A; it contains a pair of radially extending, aligned pole-pieces 3 and 4 and a test-piece 5 suspended by a fibre 5A between the mountings 13 and 14. The cell is slidably mounted between the poles 6 and 7 of a permanent magnet and when in position for use is arranged as shown in Figure 1, so that the pole-pieces 3 and 4 are aligned with the poles 6 and 7. The ends of the pole-pieces 3 and 4 face each other and are spaced apart to provide a first zone 2 between them. The dead-space of the first zone 2 is reduced by the blocks of non-magnetic material 8 and 9. The second zone 10 of the cell, is adjacent to the first zone 2 and is not separated from it by a physical barrier. The cell is fitted with the gas inlet tube 11 and the gas outlet tube 12, the inner ends of which face substantially diametrically opposite portions of the interior surface of the annular wall 1A.

When the apparatus is to be used to measure the magnetic susceptibility of a gas and hence to determine its composition, the gas is introduced into the inlet tube 11 at a pressure such that it circulates with streamlined flow through and along paths confined to the second zone 10 as shown by the dotted lines in Figure 2 and eventually passes out of the outlet tube 12. The flow paths pass to the sides of the pole-pieces 3 and 4 and do not extend into the zone 2. While the gas is present in the zone 10, diffusion takes place between the zones 10 and 2, so that the test-piece 5 becomes surrounded with the gas without being directly subjected to the current of gas passing through the zone 10. The test-piece 5 tends to move according to the magnetic susceptibility of the gas and the force exerted on the test-piece is measured in a known manner, thus enabling the composition of the gas to be determined.

I claim:

1. In apparatus for measuring the magnetic susceptibility of a gas, a cell having a substantially annular wall, a pair of aligned magnet pole pieces mounted in said cell and extending substantially radially thereof, said pole pieces having facing ends spaced from each other and shaped to produce a non-uniform magnetic field therebetween, a test-piece, means including a fibre mounting said test-piece between said ends, gas inlet means extending into said cell and adapted to direct gas onto a predetermined portion of the interior surface of said wall and gas outlet means extending into said cell and adapted to remove gas from adjacent a portion of the interior surface of said wall which is substantially diametrically opposite from said predetermined portion.

2. In apparatus for measuring the magnetic susceptibility of a gas, a cell having an annular wall, a pair of magnet pole pieces extending into said cell radially to said wall, said pole pieces extending into said cell from substantially diametrically opposite portions of said wall and the facing ends of said pole pieces being spaced from each other and being shaped to produce a non-uniform magnetic field therebetween, a test-piece, means including a fibre mounting said test-piece between said ends, a gas inlet tube extending into said cell and mounted with its end within said cell adjacent and facing a predetermined portion of the interior surface of said wall and a gas outlet tube extending into said cell and mounted with its end within said cell adjacent and facing a portion of the interior surface of said wall which is substantially diametrically opposite from said predetermined portion.

3. Apparatus for measuring the magnetic susceptibility of a gas comprising a cell, a pair of magnet pole pieces mounted in said cell with an end of one pole piece facing and spaced from an end of the other pole piece, said pole pieces being shaped to produce a non-uniform magnetic field between said ends, the space between said ends being a first zone, and a portion of the space within said cell and outside of and immediately adjacent to said first zone being unobstructed and being a second zone in gas communication with said first zone, a test-piece, means displaceably mounting said test-piece in said first zone, and gas inlet means and gas outlet means for passing the gas through said second zone and disposed respectively in different portions of said zone, said cell having means defining substantially unobstructed and smooth gas flow paths extending through said second zone and away from said first zone and extending between said inlet means and said outlet means for permitting substantially streamlined and turbulence free flow of the gas through said second zone and between said inlet and said outlet means and said outlet means including means for directing said gas along said paths.

References Cited in the file of this patent

UNITED STATES PATENTS

| 2,666,893 | Munday | Jan. 19, 1954 |
| 2,693,103 | Krupp | Nov. 2, 1954 |

FOREIGN PATENTS

| 875,950 | France | July 13, 1942 |